United States Patent [19]

Khan

[11] Patent Number: 4,989,176
[45] Date of Patent: Jan. 29, 1991

[54] REMOTE MAINTENANCE SYSTEM

[75] Inventor: Salim M. Khan, Phoenix, Ariz.

[73] Assignee: AG Communication Systems Corporation, Phoenix, Ariz.

[21] Appl. No.: 282,915

[22] Filed: Dec. 6, 1988

Related U.S. Application Data

[63] Continuation of Ser. No. 935,894, Nov. 28, 1986, abandoned.

[51] Int. Cl.$^5$ .............................................. G06F 3/00
[52] U.S. Cl. ................................ 364/900; 364/919.4; 364/929; 364/932.8; 364/933.9; 364/945.7
[58] Field of Search ... 364/200 MS File, 900 MS File; 371/15.1, 16.1, 20.1

[56] References Cited

U.S. PATENT DOCUMENTS

| | | | |
|---|---|---|---|
| 3,733,587 | 5/1973 | Lloyd et al. | 364/900 |
| 3,910,322 | 10/1975 | Hardesty, Jr. et al. | 364/200 |
| 4,225,918 | 9/1980 | Beadle et al. | 364/200 |
| 4,282,399 | 8/1981 | Kippenhan, Jr. et al. | 178/4 |
| 4,308,615 | 12/1981 | Koegel et al. | 371/20 |
| 4,442,502 | 4/1984 | Friend et al. | 364/900 |
| 4,539,652 | 9/1985 | Rubin | 364/900 |
| 4,539,655 | 9/1985 | Trussell et al. | 364/900 |
| 4,648,029 | 3/1987 | Cooper et al. | 364/200 |
| 4,695,946 | 9/1987 | Andreasen et al. | 364/200 |

Primary Examiner—Thomas M. Heckler
Attorney, Agent, or Firm—Anthony Miologos

[57] ABSTRACT

A system is shown for interfacing between a work station or intelligent terminal device and a number of maintainable telecommunication systems. This system provides for interfacing between an intelligent CRT terminal and up to 26 remotely located maintenance processor units. This system provides the CRT attendant or crafts person with the ability to trouble-shoot or perform diagnostic testing upon a maintenance processor unit which is remotely located. In addition, the work station or intelligent terminal may be remotely located from the interface circuitry. This system establishes a connection between the work station or intelligent terminal and a particular maintenance processor unit. Once that connection is established, the maintenance processor unit of that telecommunications system reports diagnostic and trouble-shooting type information. This system also provides for manual reset and self test capabilities. This system provides for a variable BAUD rate which may be preprogrammed into a microcontroller device.

18 Claims, 2 Drawing Sheets

REMOTE MAINTENANCE SYSTEM

This is a continuation of co-pending application Ser. No. 935, 894 filed on Nov. 28, 1986, now abandoned.

BACKGROUND OF THE INVENTION

The present invention pertains to maintenance of telecommunication switching and transmission systems and more particularly to remote monitoring and access of a number of maintainable electronic switching and transmission systems from a centralized intelligent terminal or work station.

Typically, switching and transmission systems require a crafts person to be physically present at the site of the equipment to perform maintenance tests and status checks. Having a crafts person travel to each of the sites of the equipment is expensive. For situations in which large amounts of equipment exist, several crafts people may be required in order to effectively monitor all the equipment. This type of arrangement entails much travel by the crafts person, along with transporting the required interface and test equipment.

With the advent of work stations and intelligent terminal devices, communications between these work stations or intelligent terminals and other work stations, intelligent terminals or devices is greatly facilitated via telephone lines. Therefore, it is advantageous for a single source to monitor a number of maintainable switching and transmission systems.

Accordingly, it is an object of the present invention to provide an interface between a single work station or an intelligent terminal and a number of maintainable telecommunication systems.

SUMMARY OF THE INVENTION

A terminal switching unit for a plurality of maintenance system has a intelligent terminal, a number of maintenance processor units residing in transmission and switching systems and a switching arrangement connected between the intelligent terminal and the maintenance processor units. The intelligent terminal transmits commands and receives data for display. Each switching and transmission system includes one corresponding maintenance processor unit. Each maintenance processor unit operates to gather and to transmit data and also to perform diagnostic testing.

The switching arrangement analyzes a command from the intelligent terminal and determines which particular maintenance processor unit has been selected. This maintenance processor unit is then connected to the switching arrangement. The switching arrangement facilitates the transfer of data from the maintenance processor unit selected to the intelligent terminal for display.

In addition, the switching arrangement also transmits a command to the maintenance processor unit to perform diagnostic testing. After the maintenance processor unit has performed the diagnostic testing, it transmits the resultant data to the switching arrangement for subsequent display on the intelligent terminal.

A BRIEF DESCRIPTION OF THE DRAWINGS

DESCRIPTION OF THE PREFERRED EMBODIMENT

Figure 1:
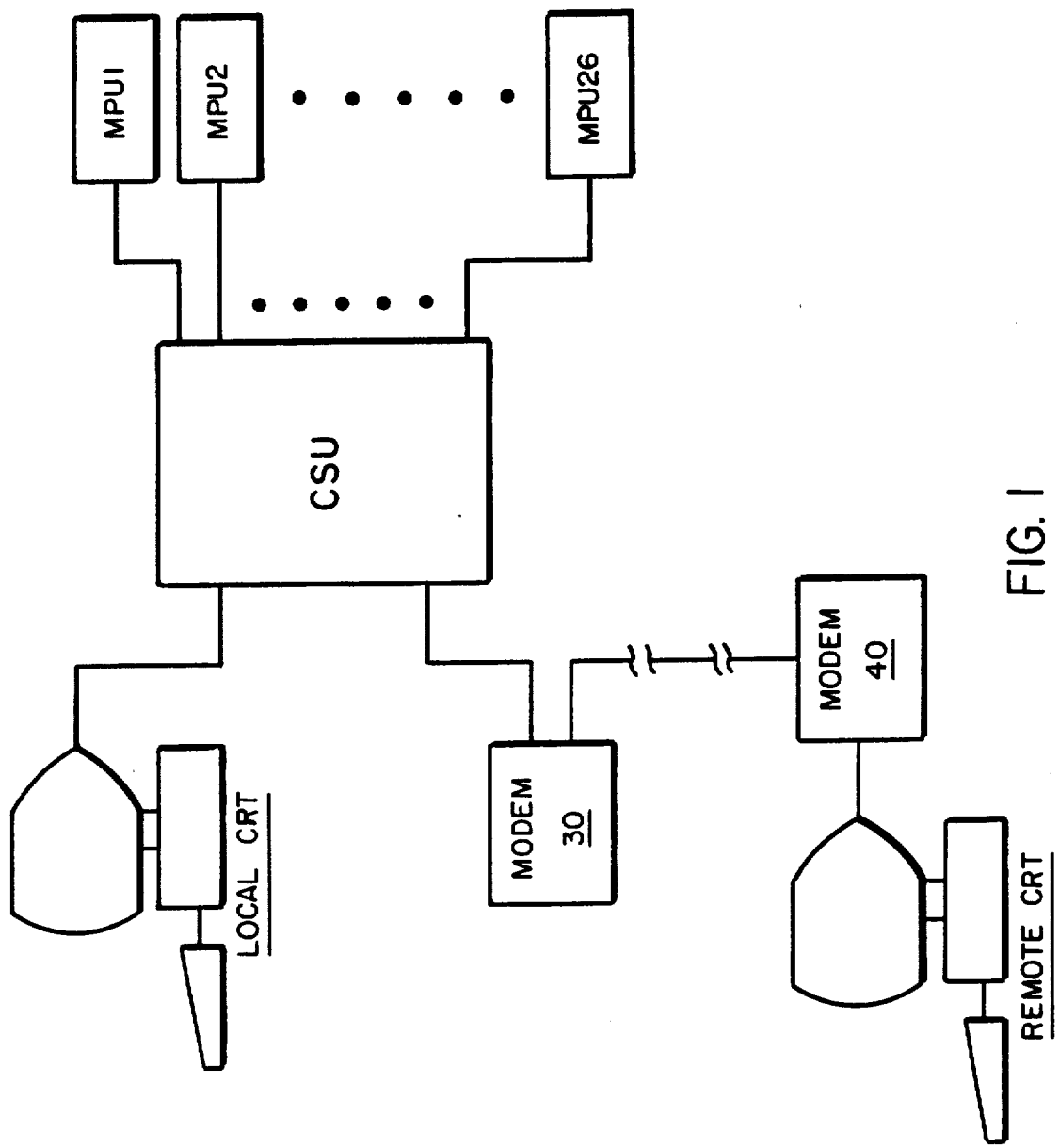
FIG. 1 is a block diagram of a remote maintenance system.

FIG. 1 depicts a terminal switching unit for a plurality of maintenance system. A local CRT (intelligent terminal or work station) is shown connected to the CRT switching unit (CSU). The remote CRT is shown connected through modem 40 and through modem 30 to the CSU. The remote CRT is also an intelligent terminal or work station.

The CSU is connected to up to 26 maintenance processor units (MPUs). The MPUs are systems which reside in either switching or transmission systems. The MPUs provide for maintenance and diagnostic interface with each of the associated switching and transmission systems. The CSU may connect the local CRT or the remote CRT to any of the 26 MPUs. An attendant or crafts person at the local or remote CRT may, via input commands, trouble-shoot or perform diagnostic testing on any of the switching or transmission systems, having an MPU. The CSU allows :, the attendant at the CRT to obtain status information of any : particular switching or transmission system.

Once the CSU establishes a connection between a CRT and the MPU of a given switching or transmission system, the MPU of that system oversees the reporting of maintenance and diagnostic data to the CSU. The CSU then facilitates transfer of the data between the MPU and either of the CRTs.

The CSU allows selection of any of the 26 MPUs by either the local CRT or the remote CSU. The CRT interfaces between a selected MPU and the remote CRT via modems 30 and 40. All the inputs and outputs to and from the CSU, except power and electrical ground, are EIA standard RS-232-C serial interface signals. The CSU provides a variable BAUD rate for interfacing to special I/0 devices. The BAUD rates are preprogrammed into the CSU software and may be rates of 300 BAUD or more. In addition, the CSU includes hardware for self test and resetting functions.

Figures 2, 3:
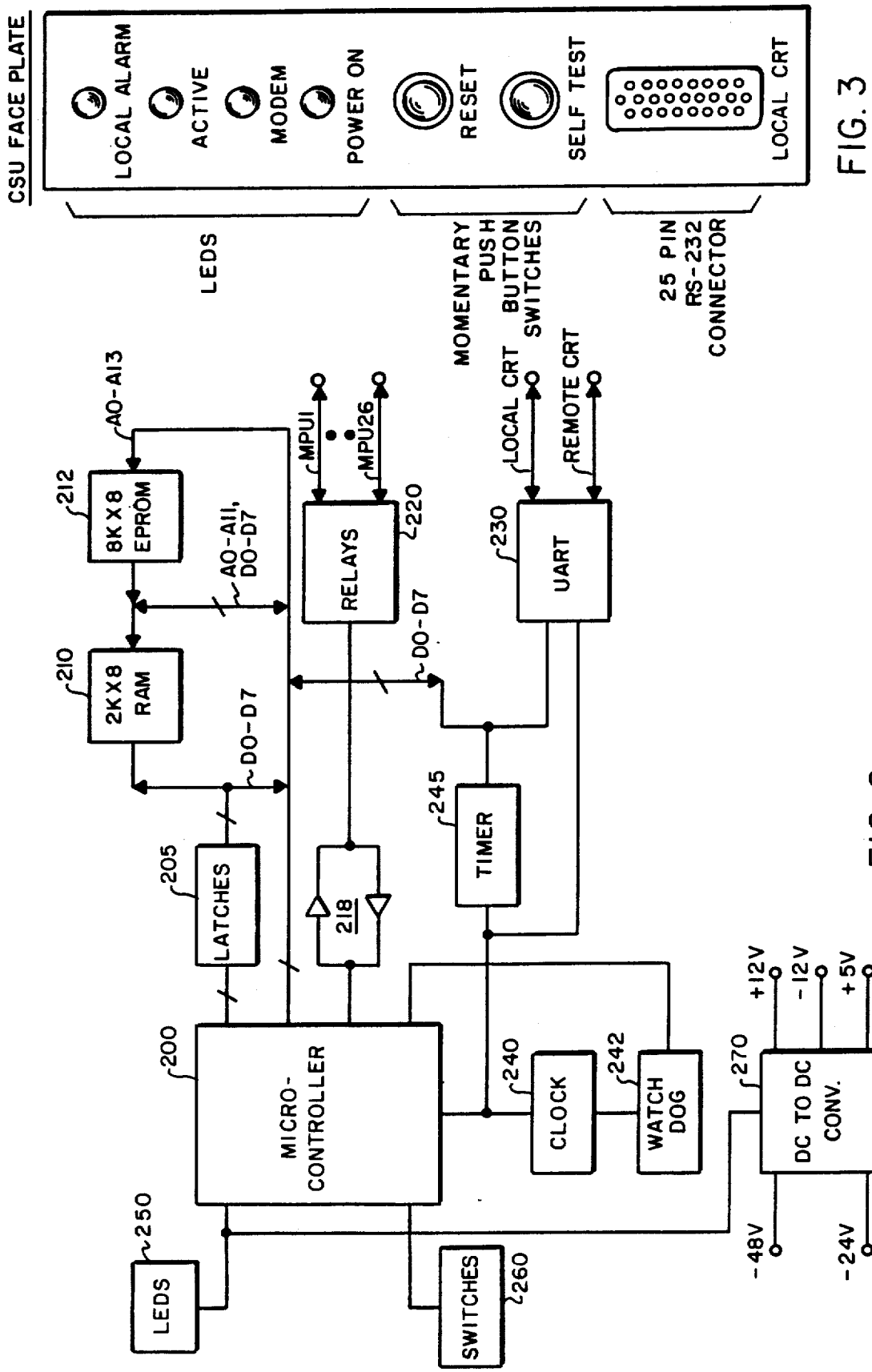
FIG. 2 is a block diagram of the CRT switching unit of FIG. 1.
FIG. 3 is a lay out of the face plate of the CRT switching unit printed wiring card.

FIG. 2 is a block diagram of the CSU switching unit. The heart of the switching unit is the microcontroller 200. The microcontroller 200 may be implemented with an Intel device part no. 8031. Intel is a register trademark of the Intel Corporation.

The CSU circuitry is implemented on one physical printed wiring card. This card may be plugged into standard switching and transmission system card files. This printed wiring card has a face plate, shown in FIG. 3. Various connections, switches and indicator lamps are incorporated on the face plate.

Input and output from the local CRT; and is transmitted to UART 230. Input and output from the remote CRT is via modem 30 and 40 and the remote lead of UART 230. UART 230 is a universal asynchronous receiver/transmitter. These input commands are transmitted via the data bus (D0–D7) to microcontroller 200. UART 230 may be implemented with an Intel device part no. 8274, multi-protocol serial control device. Microcontroller 200 is connected via a bidirectional link 218 to relays 220. Relays 220 select a connection to one of the 26 MPUs.

Microcontroller 200 is connected to latches 205. Latches 205 operate to latch an output memory address. The bidirectional data bus D0–D7 connects both RAM 210 and EPROM 212 to microcontroller 200. Microcontroller 200 is connected to RAM 210 via the address bus leads A0 through A11. Microcontroller 200 is also connected to EPROM 212 via address bus leads A0 through A13. RAM 210 is a random access memory device providing a 2K by 8-bit memory. EPROM 212 is an electronically programmable read only memory of size 8K by 8-bits.

Timer 245 is connected to UART 230, microcontroller 200 and to clock 240. Timer 245 may be implemented with an Intel programmable interval timer part no. 8254.

The clock 240 drives all the timing functions of CSU. The clock is connected to microcontroller 200, to timer 245, to UART 230 and to watch dog timer 242. The clock provides a frequency of approximately 11.059 megahertz.

DC to DC converter 270 provides all power to this circuit as well as for illuminating the lamp indicators on the face plate via a connection to the LEDs 250. The DC to DC converter 270 will take either −48 volts or −24 volts as an input, and provide +12 volts, −12 volts and +5 volts as outputs.

The LEDs 250 and the switches 260 are connected to the microcontroller 200. The microcontroller 200 serves to light or extinguish each of the light emitting diodes (lamps) 250. Switches 260 serve to input various functions to microcontroller 200. These function included self test and general reset functions.

The local CRT is connected to UART 230 via the local CRT lead. The remote CRT via modem 30 is connected to modem 40 with modem 40 connected to UART 230 via the remote CRT lead. Each of the MPUs is connected to relays 220 via a corresponding lead MPU1 through MPU26.

Commands are input from the local or remote CRTs to UART 230. These commands are transferred from UART 230 via the data bus D0–D7 to microcontroller 200. Then, microcontroller 200 analyzes the command. Microcontroller 200 determines which MPU is requested by the command and connects to that MPU via relays 220. When the particular MPU responds, the response is transmitted through relays 220 via the bidirectional link 218 to microcontroller 200.

EPROM 212 contains the operating firmware for microcontroller 200. RAM memory 210 is a scratch pad data area for receiving and holding data transmitted by an MPU to the CSU. When RAM memory 210 has been filled with MPU data, microcontroller 200 will transmit a message to the MPU, causing the MPU to cease transmitting any more data, until RAM memory 210 has available storage.

Microcontroller 200 displays the data transmitted received from an MPU upon the CRT which had made the request. Then, the MPU will control sending all requested data, until this data has been sent to the CSU and displayed upon the appropriate CRT.

Timer 245 is a microcomputer peripheral device which supports asynchronous, byte synchronous and bit synchronous : protocols. Asynchronous communication protocols are used by the CSU during its interface with the CRTs. Timer 245 supports two receiver/transmitter channels. One channel supports the local CRT and the other channel supports the remote CRT.

Clock 240 drives the other various timing functions of the CSU. These functions include the microcontroller, timer 245, UART 230, and watch dog timer 242. The watch dog timer circuitry 242 is located on the CSU printed wiring card and provides a circuit which must be reset by the microcontroller 200 software every 42 milliseconds. Failure of the microcontroller 200 software to reset the watch dog timer circuitry will result in a watch dog time-out. As a result of the watch dog time-out, watch dog circuit 242 will issue a reset signal to microcontroller 200 and to associated latching circuitry. This condition will also cause the local alarm lamp LED (Light Emitting Diode) to be turned-on. This local alarm lamp, along with other lamps, switches and a connector, are located on the face plate of the CSU printed wiring card, shown in FIG. 3.

LEDs 250 includes the local alarm LED mentioned above. In addition, LEDs 250 include an active lamp, a modem lamp and a power on lamp. The active lamp indicates that the CSU is in active operation. The signal lighting this lamp is generated by software command during normal CSU operation. The modem lamp indicates that the modem port of the CSU is in use. This signal is generated by software of the CSU, when it is interfacing with the remote CRT via the modems. The power on light indicates that each of the three voltages (+12 volts, −12 volts and +5 volts) is being provided to the CSU. The power on light is turned-off when the +5 volt or +12 volt power supply is reduced to a zero voltage level or when the −12 volt power supply drops below a −6 volt level.

Switches 260 are momentary pushbutton switches for reset and self test functions. The reset pushbutton causes microcontroller 200 and associated latching circuitry to be reset. The self test pushbutton enables the microcontroller 200 to perform predefined self test routines in response to an interrupt signal generated by pushing of the self test pushbutton.

The DC to DC converter 270 produces +12 volts, −12 volts and +5 volts from either a −48 volt source or a −24 volt source.

FIG. 3 depicts the CSU face plate. Four lamps or LEDs are shown for each of the above mentioned functions. In addition, two momentary pushbutton switches and a 25 pin RS-232-C connector for connecting the local CRT to the CSU are shown.

Although the preferred embodiment of the invention has been illustrated, and that form described in detail, it will be readily apparent to those skilled in the art that various modifications may be made therein without departing from the spirit of the invention or from the scope of the appended claims.

What is claimed is:

1. A terminal switching unit for a plurality of maintenance systems comprising:
   intelligent terminal means including at least one local intelligent terminal means and at least one remote intelligent terminal means, said local and said remote intelligent terminal means each operated to transmit commands and to receive and display data;
   said remote intelligent terminal means including, first modem means connected to said remote intelligent terminal means and to a transmission line, said first modem means arranged to transmit said commands from said remote intelligent terminal means to said transmission line and to receive said data from said transmission line and to transmit said data to said remote intelligent terminal means;
   a plurality of switching and transmission systems and a plurality of maintenance processor unit means, each switching and transmission system including one corresponding maintenance processor unit means, each maintenance processor unit means arranged to perform diagnostic testing of said corresponding switching and transmission system responsive to said commands, and to transmit said data gathered during the diagnostic testing of said corresponding switching and transmission system;

switching means including second modem means connected to said switching means and to said transmission line, said second modem means arranged to transmit said data from said switching means to said transmission line and to receive said commands from said transmission line, said switching means further connected to said local intelligent terminal means and each of said plurality of maintenance processor unit means, said switching means operable to analyze said commands transmitted by said local intelligent terminal means and to connect one of said plurality of maintenance processor unit means to said local intelligent terminal means for facilitating the transfer of said data from the connected maintenance processor unit means to said local intelligent terminal mans, and alternatively said switching means further operable to analyze said commands transmitted by said remote intelligent terminal means and to connect one other of said plurality of maintenance processor unit means to said remote intelligent terminal means for facilitating the transfer of said data from the connected maintenance processor unit means to said remote intelligent terminal means;

said switching means being further operated in response to said commands to transmit said commands from said local intelligent terminal means to the connected maintenance processor unit means and alternatively, to transmit said commands from said remote intelligent terminal means to the connected maintenance processor unit mans; and and in response to said commands from said local intelligent terminal means the connected maintenance processor unit performs said diagnostic testing of said corresponding switching and transmission system, transmitting said data to said switching means and alternatively, in response to said commands form said intelligent terminal means the connected maintenance processor unit means performs said diagnostic testing of said corresponding switching and transmission system transmitting said data to said switching means.

2. A terminal switching unit as claimed in claim 1, said switching means including receiver/transmitter means connected to said local intelligent terminal means and to said second modem means, said receiver/transmitter means being operated in response to commands from said local and said remote intelligent terminal means to transmit parallel data in response to received serial data and to transmit serial data in response to received parallel data.

3. A terminal switching unit as claimed in claim 2, said switching means further including controller means connected to said receiver/transmitter means, said controller means being operated in response to parallel data of said receiver/transmitter of maintenance processor unit means, said controller means being further operated in response to said data of said one connected maintenance processor unit means to transmit said parallel data to said receiver/transmitter means.

4. A terminal switching unit as claimed in claim 3, said switching means further including:

bidirectional link means connected to said controller means, said bidirectional link means being operate to transmit said commands and receive said data to and from said controller means; and relay means connected between said bidirectional link means and each of said plurality of maintenance processor unit means, said relay means being operated in response to said controller means to connect said one maintenance processor unit means to said controller means via said bidirectional link means.

5. A terminal switching unit as claimed in claim 4, said switching means further including latching means connected to said controller means via an address bus, said latching means being operated in response to an address transmitted on said address bus by said controller means to store said transmitted address.

6. A terminal switching unit as claimed in claim 5, said switching means further including first memory means connected to said latching means and to said controller means via a data bus, said first memory means being operated to store data transmitted from said controller means via said data bus.

7. A terminal switching unit as claimed in claim 6, said switching means further including second memory means connected to said first memory means and to said controller means, said second memory means being operated to store and transmit program code instructions to said controller means for operating said controller means.

8. A terminal switching unit as claimed in claim 7, said switching means further including clock means connected to said controller means and to said receiver/transmitter means, said clock means being operated to produce a plurality of periodic signals.

9. A terminal switching unit as claimed in claim 8, said switching means further including timer means connected to said clock means and to said receiver/transmitter means, said timer means being operated in response to one of said plurality of periodic signals of said clock means to transmit one of a plurality of protocol signals to said receiver/transmitter means for operating said receiver/transmitter means at one of a plurality of BAUD rates.

10. A terminal switching unit as claimed in claim 9, said switching means further including watch dog means connected to said clock means and to said controller means, said watch dog means being operated in response to an absence of a periodic first signal of said controller means to produce a second signal for resetting said controller means.

11. A terminal switching unit as claimed in claim 10, wherein there is further included indicator means connected to said controller means;

said first means including:
first lamp means for indicating an alarm status of said remote maintenance system;
second lamp means for indicating an active operation of said remote maintenance system;
third lamp means for indicating an active operation of said remote intelligent terminal means; and
fourth lamp means for indicating a power status condition of said remote maintenance system.

12. A terminal switching unit as claimed in claim 11, wherein there is further included manual input means connected to said controller means, said manual input means including:

first pushbutton means being operated to generate a signal to reset said remote maintenance system; and second pushbutton means being operated to generate a signal for self testing said remote maintenance system.

13. A terminal switching unit as claimed in claim 12, wherein there is further included connector means for connecting said local intelligent terminal means to said receiver/transmitter means.

14. A terminal switching unit as claimed in claim 13, wherein there is further included power converter means connected to said controller means and to said indicator means, said power converter means being operated in response to a power input signal of a first or a second DC voltage level to produce power output signals of third, fourth and fifth DC voltage levels.

15. A terminal switching unit as claimed in claim 7, said second memory means including electronically programmable read only memory means.

16. A terminal switching unit as claimed in claim 6, said first memory means including random access memory means.

17. A terminal switching unit for a plurality of maintenance systems comprising:

intelligent terminal means including at least one local intelligent terminal means, said local intelligent terminal means operated to transmit commands and to receive and display data;

a plurality of switching and transmission systems and a plurality of maintenance processor unit means, each switching and transmission system including one corresponding maintenance processor unit means, each maintenance processor unit means arranged to perform diagnostic testing of said corresponding switching and transmission system responsive to said commands, and to transmit said data gathered during the diagnostic testing of said corresponding switching and transmission system;

switching means connected to said local intelligent terminal means, and each of said plurality of maintenance processor unit means, said switching means including controller means arranged to analyze the commands transmitted by said local intelligent terminal means, bidirectional link means connected to said controller means for transmitting said commands and receiving said data to and from said controller means, and relay means connected between said bidirectional link means and each of said plurality of maintenance processor unit means, and responsive to said commands from said local intelligent terminal means said relay means are operated by said controller means to connect a maintenance processor unit means to said local intelligent terminal means for facilitating the transfer of said data from said connected maintenance processor unit means to said local intelligent terminal means;

said switching means being further operated in response to said commands to transmit commands form said local intelligent terminal means to the connected maintenance processor unit means; and said maintenance processor unit means operated in response to said commands from said local intelligent terminal means to perform said diagnostic testing of said corresponding switching and transmission system and to transmit said data to said switching means.

18. A terminal switching unit for a pluraltiy of remote maintenance systems comprising:

intelligent terminal means including at least one remote intelligent terminal means operated to transmit commands and to receive and display data, said remote intelligent terminal means including, first modem means connected to said remote intelligent terminal means and to a transmission line, said first modem means arranged to transmit said commands from said remote intelligent terminal means to said transmission line and to receive said data from said transmission line and to transmit said data to said remote intelligent terminal means;

a plurality of switching and transmission systems and a plurality of maintenance processor unit means, each switching and transmission system including one corresponding maintenance processor unit means, each maintenance processor unit means arranged to perform diagnostic testing of said corresponding switching and transmission system responsive to said commands, and to transmit said data gathered during the diagnostic testing of said corresponding switching and transmission system;

switching means including second modem means connected to said switching means and to said transmission line, said second modem means arranged to transmit said data from said switching means to said transmission line and to receive said commands from said transmission line, and said switching means further connected to each of said plurality of maintenance processor unit means, said switching means including controller means arranged to analyze the commands transmitted by said remote intelligent terminal means, bidirectional link means connected to said controller means for transmitting said commands and receiving said data to and from said controller means, and relay means connected between said bidirectional link means and each of said plurality of maintenance processor unit means, and responsive to said commands form said remote intelligent terminal means said relay means are operated by said controller means to connect a maintenance processor unit means to said remote intelligent terminal means for facilitating the transfer of said data from said connected maintenance processor unit means to said remote intelligent terminal means;

said switching means being further operated in response to said commands to transmit said commands from said remote intelligent terminal means to the connected maintenance processor unit means; and said maintenance processor unit means operated in response to said commands form said remote intelligent terminal means to perform said diagnostic testing of said corresponding switching and transmission system and to transmit said data to said switching means.

* * * * *